(12) United States Patent
Castelli et al.

(10) Patent No.: US 10,481,794 B1
(45) Date of Patent: Nov. 19, 2019

(54) DETERMINING SUITABILITY OF STORAGE

(75) Inventors: Brian A. Castelli, Fuquay Varina, NC (US); Alexander C. McLeod, North Reading, MA (US); Paul D. Tynan, Lexington, MA (US); Amrinder Singh, Morrisville, NC (US); Tyler M. Graves, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 755 days.

(21) Appl. No.: 13/171,100

(22) Filed: Jun. 28, 2011

(51) Int. Cl.
*G06F 3/06* (2006.01)
(52) U.S. Cl.
CPC ............ *G06F 3/0604* (2013.01); *G06F 3/067* (2013.01); *G06F 3/0631* (2013.01); *G06F 3/0644* (2013.01); *G06F 3/0653* (2013.01); *G06F 3/0605* (2013.01); *G06F 3/0632* (2013.01); *G06F 3/0634* (2013.01); *G06F 3/0683* (2013.01)
(58) Field of Classification Search
CPC .... G06F 3/0631; G06F 9/5016; G06F 12/023; G06F 3/0604; G06F 3/0605; G06F 3/0632; G06F 3/0634; G06F 3/0644; G06F 3/0653; G06F 3/067; G06F 3/0683; G06F 3/0689
USPC .......................... 711/100, 114, 154, 163, 170
See application file for complete search history.

(56) References Cited

U.S. PATENT DOCUMENTS

| | | | | |
|---|---|---|---|---|
| 5,287,500 A * | 2/1994 | Stoppani, Jr. | ......... | G06F 3/0601 711/211 |
| 5,491,810 A * | 2/1996 | Allen | ............................ | 711/117 |
| 6,560,647 B1 * | 5/2003 | Hafez et al. | ................... | 709/224 |
| 6,976,134 B1 * | 12/2005 | Lolayekar | ............. | G06F 3/0613 709/214 |
| 7,434,011 B2 * | 10/2008 | Shue | ...................... | G06F 3/0605 700/31 |
| 7,480,912 B2 * | 1/2009 | Arnold | ................... | G06F 9/5016 711/111 |
| 7,512,754 B1 * | 3/2009 | Chaitanya | ............. | G06F 3/0605 711/154 |
| 7,930,476 B1 * | 4/2011 | Castelli | ................. | G06F 9/5016 709/225 |
| 8,082,330 B1 * | 12/2011 | Castelli et al. | ............... | 709/220 |
| 8,429,307 B1 * | 4/2013 | Faibish | ................. | G06F 3/0605 710/1 |
| 8,473,678 B1 * | 6/2013 | Rajasekaran | ......... | G06F 3/0605 711/114 |

(Continued)

OTHER PUBLICATIONS

Y. Lu, D. H. C. Du and T. Ruwart, "QoS provisioning framework for an OSD-based storage system," 22nd IEEE/13th NASA Goddard Conference on Mass Storage Systems and Technologies (MSST'05), Monterey, CA, USA, 2005, pp. 28-35. doi: 10.1109/MSST.2005.27 (Year: 2005).*

*Primary Examiner* — Nathan Sadler
*Assistant Examiner* — Aaron D Ho
(74) *Attorney, Agent, or Firm* — Krishnendu Gupta; Deepika Bhayana

(57) ABSTRACT

A method is used in determining suitability of storage. Storage data of a data storage system is analyzed. The storage data includes information associated with use of a storage object of the data storage system by an application of the data storage system. A storage suitability characteristic for the storage object is determined. The storage suitability characteristic for the storage object is provided to a user for provisioning storage for the application in the data storage system.

18 Claims, 12 Drawing Sheets

(56) References Cited

U.S. PATENT DOCUMENTS

| | | | |
|---|---|---|---|
| 2003/0110263 A1* | 6/2003 | Shillo | G06F 3/0601 709/226 |
| 2008/0229045 A1* | 9/2008 | Qi | G06F 3/0605 711/170 |
| 2011/0010445 A1* | 1/2011 | Das et al. | 709/224 |
| 2012/0159112 A1* | 6/2012 | Tokusho | G06F 3/0611 711/171 |

* cited by examiner

DETERMINING SUITABILITY OF STORAGE

BACKGROUND

Technical Field

This application relates to determining suitability of storage.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems (also referred to as "storage array" or simply "array") may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Separate from but intimately related to performance maximization is the problem of underuse of scarce physical resources. Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or volumes.

Historically speaking, there is a trend toward larger operating systems, larger applications or programs, and larger file sizes. For example, the footprint of a popular operating system for personal computers has grown from megabytes of disk space to gigabytes of disk space for a basic installation. Programs and applications are getting larger as well. With the advent of the internet, it is popular to store multimedia files that are megabytes or gigabytes in size, up from the typical file size in kilobytes of a decade ago. Understanding this trend, a storage administrator is likely to provision a larger portion of storage area than is currently required for an operating system, for example, with the expectation that the space requirements will grow with upgrades, bug-fixes, and the inclusion of additional features.

The problem of underuse arises when, for example, an amount of storage space is allocated to, but not used by, an operating system, program, process, or user. In this scenario, the scarce (and probably expensive) resource—disk storage space, for example—is unused by the entity that requested its allocation and thus unavailable for use by any other entity. In many cases, the unused space cannot be simply given back. For example, a database installation may require many terabytes of storage over the long term even though only a small fraction of that space may be needed when the database is first placed into operation. In short, it is often the case that the large storage space will be eventually needed, but it is not known exactly when the entire space will be needed. In the meantime, the space lies unused and unavailable for any other use as well.

Recognizing that more storage space may be provisioned for operating systems, programs, and users than they may actually use at first, the concept of a sparsely populated or "thin" logical unit (TLU) was developed. Unlike the more traditional "fat" or fully allocated logical unit (FLU), which is created by provisioning and allocating a certain amount of storage area, a TLU is provisioned at creation but is not allocated any physical storage until the storage is actually needed. For example, physical storage space may be allocated to the TLU upon receipt of an I/O write request from a requesting entity, referred to herein as a "host". Upon receipt of the write request from the host, the data storage system may then determine whether there is enough space already allocated to the TLU to store the data being written, and if not, allocate to the TLU additional storage space. Thin Provisioning is a method for optimizing utilization of available storage of a data storage system. Thin provisioning relies on on-demand allocation of blocks of data versus the traditional method of allocating all the blocks up front. An application created in a data storage system using thin provisioning is known as a thin application, and the thin application is allocated storage from TLUs. An application created using traditional method of allocating all the storage requested by the application up front is known as a thick application, and the thick application is allocated storage from FLUs. For example, a storage pool may be created by specifying an upper limit of storage space such that the upper limit of storage space for a TLU is greater than the total amount of storage actually allocated to the storage pool. This mechanism of allocating storage is also referred to as over-commitment of storage capacity. For example, a data storage system may include one FLU and one TLU in a storage pool that together have 120 GB of storage space. In this example, the actual storage space available, however is 100 GB. This mismatch is possible because the TLU may consume only 60 GB of actual storage space, even though it may grow up to 100 GB. Further, in this example, the FLU of 20 GB must have the entire 20 GB pre-allocated whether or not a thick application actually consumes any portion of 20 GB of storage space.

Different tasks may be performed in connection with a data storage system. For example, software may be executed on the data storage system in connection with performing data storage administration tasks such as for data storage configuration, management, and/or monitoring. Such tasks may include, for example, configuring storage for use with an email application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration and allocation of storage, a customer may not have the appropriate level of sophistication and knowledge needed. Also, the particular level of knowledge may vary with each user. Additionally, a single user's knowledge level may vary for different applications and/or tasks that the single user may perform.

Thus, it may be desirable to utilize a technique for assisting a user of a data storage system in determining suitability of storage for provisioning storage in connection with performing requests for different tasks. It may be desirable that the technique provide for suitability of storage in accordance with the particular user as well as the varying knowledge levels of a single user when performing different tasks.

SUMMARY OF THE INVENTION

A method is used in determining suitability of storage. Storage data of a data storage system is analyzed. The storage data includes information associated with use of a storage object of the data storage system by an application of the data storage system. A storage suitability characteristic for the storage object is determined. The storage suitability characteristic for the storage object is provided to a user for provisioning storage for the application in the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
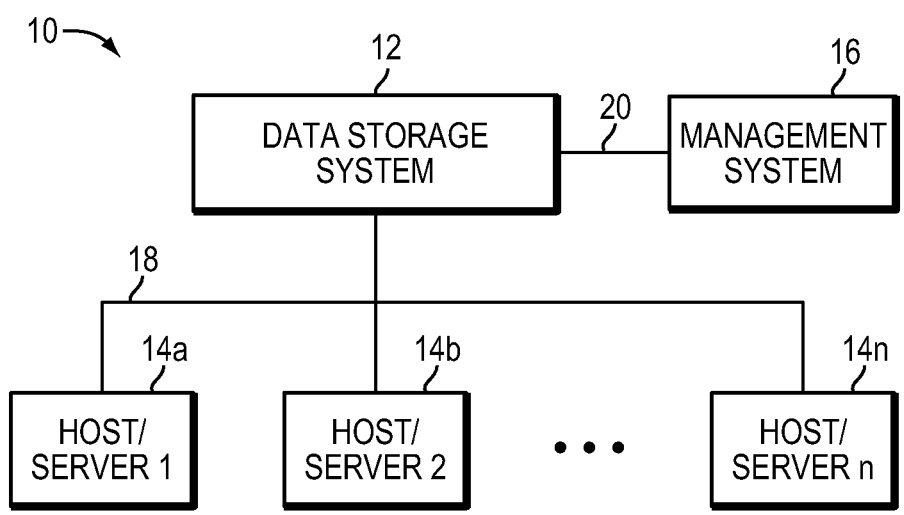
FIG. 1 is an example of an embodiment of a computer system that may utilize the techniques described herein.

Described below is a technique for use in determining suitability of storage, which technique may be used to provide, among other things, analyzing storage information of a data storage system, determining a storage suitability characteristic for a storage object, and providing the storage suitability characteristic for the storage object to a user for provisioning storage for an application in a data storage system.

Storage provisioning is a process of assigning storage (or "disk space") to applications executing on a host system connected to a data storage system. A storage is provisioned to each of the applications based on requirements of each of the applications. For example, an application such as Microsoft Exchange may require 100 gigabytes (GB) of space for storing emails, and the required storage is provisioned from the total amount of storage available in a data storage system. Thus, an application executing on a host system access the storage provisioned on a data storage system. However, a storage space allocated for one application cannot be used by an other application. For example, if a storage space of 500 gigabytes (GB) is provisioned for a database that is currently using only 100 gigabytes (GB), remaining storage space of 400 gigabytes (GB) goes unused until the application actually uses a portion of the remaining storage. However, when an amount of storage space provisioned for an application is less than the application requires, users may experience network or application performance problems. Additionally, in such a case, the application may use all the provisioned storage space and fails due to an out of space error. Conversely, provisioning more storage than an application requires may result in waste of storage resources.

Thin storage provisioning eliminates the problem of allocated but unused storage space by assigning a storage space to an application on an "as needed" manner. Thin storage provisioning creates a pool of virtual storage (e.g. TLU) that is allocated to applications in a conventional manner. The virtual storage may be supported by a much smaller pool of actual storage that is provisioned to applications as an actual amount of storage space needed by applications. In a thin provisioned data storage system, a storage administrator tracks a storage capacity for the entire data storage system, instead of having to track the storage capacity for each application of the data storage system. However, when a thin application runs out of storage space, all thin applications on the data storage system run out of space, not just a single application.

Generally, storage administrators must provide users of applications with access to hundreds of gigabytes (even terabytes) of data, while making the efficient use of available storage space of a data storage system. When provisioning storage, a storage administrator must ensure that each application receives an adequate amount of space, while maintaining or improving performance of a data storage system. Typically, requirements of an application includes a type of disk, a type of a storage tier, a type of RAID level, performance of the application, an initial storage capacity required by the application, and an amount of storage space required for potential growth of the application data. A storage space is provisioned to an application by allocating a storage pool suitable to the application based on requirements of the application.

Conventionally, a storage administrator manually provisions storage for an application executing on a data storage system. In such a conventional system, provisioning storage may be difficult, tedious and an error-prone process, requiring a detailed knowledge of requirements of applications. Conventionally, a rating value is associated with a storage pool such that a storage administrator selects a storage pool based on the rating value of the storage pool. In such a conventional system, once a rating value is assigned to a storage pool based on, for example, a type of a disk and a RAID level of the storage pool, the rating value does not change. For example, in such a conventional system, a rating value of one star is considered a good storage choice, a rating value of two stars is considered a better storage choice, and a rating value of three stars is considered a best storage choice. In such a conventional system, a storage administrator selects a storage pool for provisioning storage based on a limited set of information such as a rating value. In such a conventional system, a storage administrator must manually compute expected growth of application data and analyze a huge amount of statistical storage data in order to allocate an adequate amount of storage space to an application. Thus, in such a conventional system, a storage administrator may select a storage pool that may not be a good fit for an application. Further, in such a conventional system, a storage pool selected by a storage administrator may not be adequate for provisioning storage for an application based on requirements of the application. Additionally, in such a conventional system, manual analysis of storage information may be a time consuming process that is prone to errors. As a result, in such a conventional system, a storage administrator may end up selecting a storage pool based on analysis that may not amount anything more than a guess regarding adequacy of the storage pool. Further, in such a conventional system, if storage is thin provisioned where a storage space allocated to an application may be more than an actual amount of storage space available, a change in requirements of the application may change suitability of a storage pool which is not taken into consideration by a rating value assigned to the storage pool at a time of creation of the storage pool.

By contrast, in at least some implementations in accordance with the technique as described herein, dynamically analyzing storage information such as storage metrics, application trends, drive types, storage pool capabilities and application best practices, dynamically determining a suitability ranking of the storage pool for provisioning storage to an application, and providing the suitability ranking of a storage pool to a storage administrator based on properties of an application such as present and projected future storage growth of the application, and the number of applications sharing an available storage space of a data storage system provides suitability of a storage pool to the storage administrator, and recommends a storage pool that may be best suited for an application. Further, in at least some implementations as described herein, the current technique provides a user of a data storage system (e.g., a storage administrator) a suitability value of a storage pool that changes dynamically based on changes such as growth of application data, an amount of storage space consumed by applications and a number of new applications created in the data storage system.

In at least some implementations in accordance with the technique as described herein, the use of determining suitability of storage can provide one or more of the following advantages: improving data storage system performance by selecting a storage pool for provisioning storage that best suits an application based on changing requirements of the application, lowering costs by improving data storage system efficiency, and reducing the amount of storage required for provisioning storage for applications by selecting a storage pool based on suitability of the storage pool that changes dynamically.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with retrieving data from the data storage system in connection with techniques described herein. As an example in connection with a medical office application server component that may executed on one or more of the hosts 14a-14n, the data storage configuration tasks may include allocating or provisioning storage for storing patient medical data such as, for example, name, address, insurance information, office visit dates, vaccination records, payments, image files containing x-rays, and the like. Tasks performed in connection with provisioning storage to store patient medical data for the medical office application may include, for example, specifying the devices (logical and/or physical) used to store the data, configuring the data storage devices used such as specifying whether data replication is performed for disaster recovery, and the like. Techniques that may be used in connection with performing data storage provisioning and configuration are described in more detail in following paragraphs in order to provide ease of use to users of the data storage system(s) 12.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for determining suitability of storage pools in data storage systems.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Described in following paragraphs are techniques that may be used to assist users of a data storage system in connection with performing data storage services such as related to data storage system configuration, provisioning of data storage, and the like. The techniques herein are adaptable to the particular knowledge level of the user. The techniques are flexible and allow for implementation of best practices and defaults in an automated fashion which are customized for the particular application, user or customer, and/or underlying data storage system and environment to meet specific customer needs. As will be described in more detail, depending on the level at which a user interacts with the data storage system, different levels or amounts of automation of the best practices may be performed. The user may elect to bypass the automation of best practices or limit the amount of automation performed by interacting with the system at various levels.

A storage pool may be a collection of disks, which may include disks of different types. Storage pools may further be subdivided into slices; for example a 1 GB slice may be the allocation element for a logical unit. As well, a pool may be use synonymously with a storage tier. That is, both a storage tier and a pool may have storage devices of different performance capabilities and costs. As well, both may contain slices (also referred to as "data slices"). A slice may be considered the smallest element that can be tracked and moved.

A disk may be a physical disk within the storage system. A LUN may be a logical unit number which is an identifier for a Logical Unit. Each slice of data may have a mapping on the location of the physical drive where it starts and ends; a slice may be sliced again.

Figure 2:
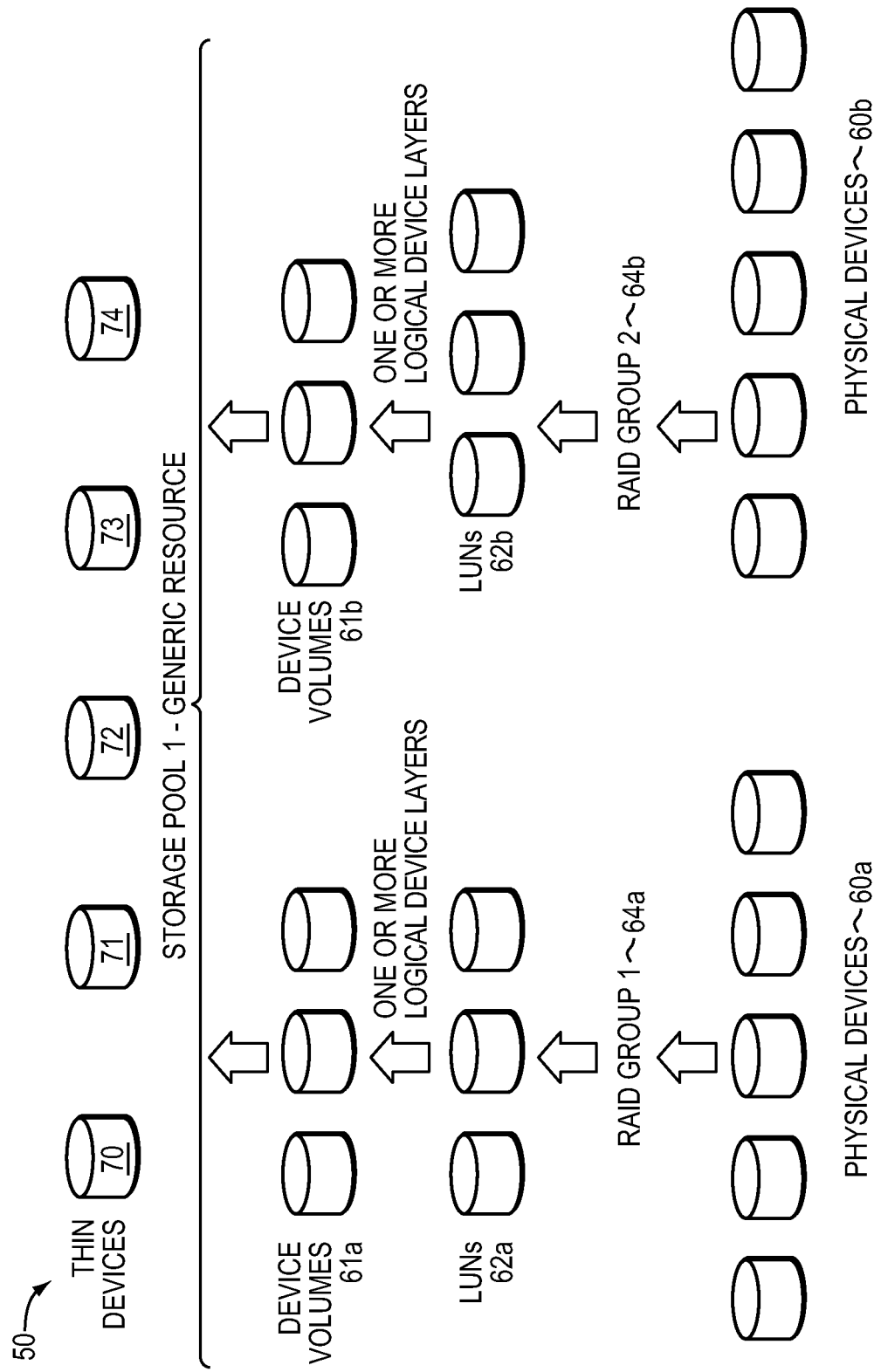
FIG. 2 is an example illustrating storage device layout.

Referring to FIG. 2, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques. The data storage system 12 may also include one or more thin devices 70-74. A thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space.

The data storage system best practices may define how to configure or form the generic storage pools, each storage pool having an associated generic storage pool type. Each underlying data storage system may have associated best practices specifying how to configure storage pools formed from physical devices in that particular data storage system. A storage extent may be formed or configured from one or more LUNs 62a-b.

Figure 3:
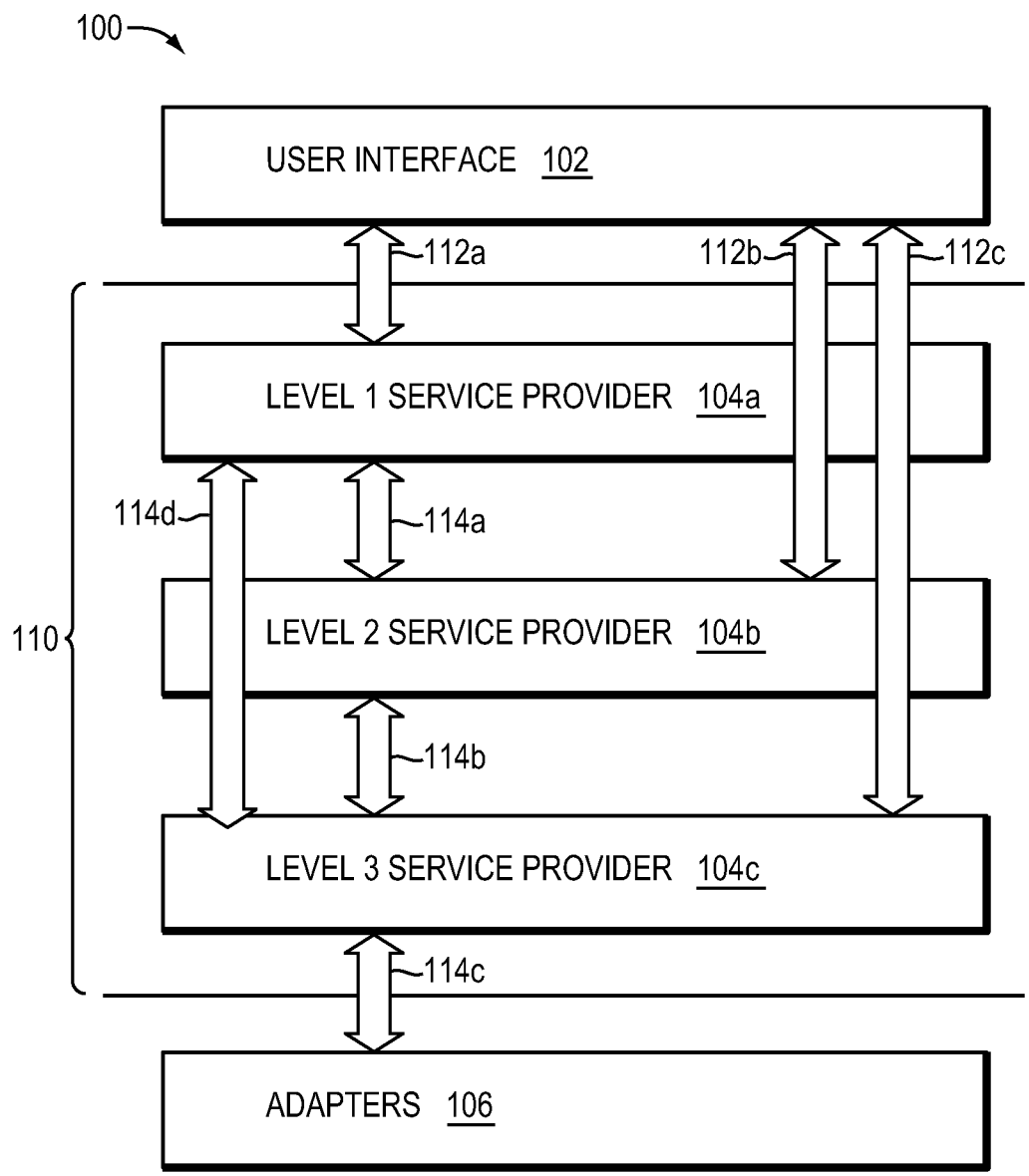
FIGS. 3-6 are diagrams illustrating in more detail components that may be used in connection with techniques herein

Referring to FIG. 3, shown is an example representation of components that may be included on the data storage system 12 for use in performing the techniques herein for data storage configuration. The example 100 includes a user interface 102, one or more levels of service providers 110, and adapters 106. In the example 100, the element 110 includes 3 service provider layers or levels 104a-104c. It should be noted that although 3 service provider levels are shown in FIG. 2, an embodiment may include any number of service provider levels.

The adapters 106 are used in connection with facilitating communications between the service providers, such as the level 3 service provider 104c, and other components. The different service providers included in the example 100 may be able to communicate directly with one another. However, when one of the service providers at one of the levels communicates with another component other than one of the service providers, an adapter may be utilized. An adapter may be characterized as a layer of software between one of the service providers, such as service provider 104c, and another component, such as a lower-level component invoked to implement data storage platform specific functionality. An adapter 106 may convert a service provider API to the API of another component. As an example, the service provider 104c may perform a call to an external component to create a file system. An adapter 106 may be used as an intervening layer between 104c and the external component in which the adapter 106 converts the API call from 104c to the API of the external component. The conversion may include, for example, mapping parameters between the API calls, performing multiple calls to the external component for the one API call from 104c, and the like. It should be noted that an adapter 106 may not utilized if such conversion is not needed.

The user interface (UI) 102 provides for one or more different types of user interfaces and associated data. For example, the UI 102 may provide support for a graphical user interface (GUI), command line interface (CLI), and the like, to support interactions between the data storage system 12 and the hosts 14a-14n of FIG. 1. Each of the different service provider levels of 110 may provide a different logical view and level of abstraction with respect to a data storage configuration task to be performed for an application executing on one of the hosts. In connection with the techniques herein, a user may interact through the UI 102 with any one of the different levels of service providers 104a-104c when performing data storage configuration requests. Each of the service providers of 110 may provide a different level of detail or abstraction with respect to the underlying operations and tasks performed on the data storage system in accordance with different levels of user sophistication and knowledge. As will be described in more detail below, the language or terminology, UI data (e.g., content or data used to populate the UI menus), and UI presentation or structure (e.g., commands presented or particular hierarchical menu structure) may vary in accordance with the particular level of service provider selected by the user. Thus, a user may interact with the data storage system at a variety of different levels when issuing data storage configuration requests for the same application. The UI may be customized for the particular level and application for which the request is performed.

In an embodiment, the UI 102 may be characterized a set of different user interfaces that may vary depending on the target user and associated user level at which the user interacts with the system. As described in more detail in following paragraphs, each level may provide a different user interface for a different level of user interaction and level of knowledge and sophistication. Each level may also be associated with a different level of automation of the best practices, for example, with users interacting at level 1 obtaining the greatest amount of automation of best practices and users interacting at level 3 obtaining none or minimal amount of automation. The UI 102 may provide multiple different user interfaces in accordance with the different levels allowing a user the option of connecting and interacting with the data storage system at any level. By allowing a user to select a level of interaction and automation, the techniques herein provide a user with a flexible approach to choose deeper levels and entry points (e.g., level 3) providing less automation and more detail as well as selection of other levels (e.g., level 1) when greater automation of best practices is desirable.

For example, level 1 service provider 104a may provide a beginner or most simplistic view of the data storage system and tasks performed for data storage configuration. Interaction with the level 1 service provider 104a requires the least amount of knowledge and may be geared toward interacting with users having minimal knowledge when performing a data storage configuration request by providing the greatest level of abstraction of the underlying system and operations performed. The language may be more non-technical in comparison to the interface language of other levels. As the level increases, so does the assumed level of knowledge of the user in connection with interactions. Level 3 service provider in the example 100 may be utilized by the most knowledgeable users providing a greatest granularity of control of all levels in connection with a data configuration request. Level 3 exposes more detailed information to the user than interactions at levels 1 and 2. As an example, a level 1 user may issue a data storage configuration request to provision storage for storing patient data of medical office application executing on one of the hosts. The level 1 user may specify a minimal amount of information in connection with the request such as only a number of patients for which storage is to be provisioned. A user may interface with the data storage system using a GUI and issue the data storage configuration request. The language and terminology of user interactions via the GUI may be customized for the level 1 user of the medical office application. In connection with the same medical office application, a more knowledgeable user may choose to issue a data storage configuration request via a GUI for a same number of patients by interacting with level 3 service 104c. At level 3, the user provides more detailed information about the request such as, for example, regarding the underlying data storage device and how this data storage device is used by the application. To further illustrate, the level 3 data storage configuration request may specify the physical and/or logical devices upon which storage is allocated, provide vendor-specific attributes or settings, indicate a number and type of file or records created, and the like. In connection with the type of file created, this may be particular to the medical office application. In connection with the user communicating with the level 1 service provider, such detail is not provided and defaults may be specified by the data storage system when implementing the level 1 data storage configuration request. The defaults may be customized for the particular application.

When implementing the request, the level 1 service provider may communicate with one or more other level service providers such as 104b and 104c. Different defaults for the particular application may be used by service providers 104b and 104c. For example with reference to the level 1 request for the email application described above, the level 1 service provider 104a may communicate with the level 2 service provider 104b. Provider 104b may then communicate with the level 3 service provider 104c to implement the request and allocate the requested storage along with specifying other defaults such as, for example, a default level of data protection. The service provider 104c may communicate with other data storage system hardware and/or software when implementing the configuration request.

As illustrated in the example 100, a service provider at a level n may generally communicate, directly or indirectly, with one or more other service providers at levels lower than level n when processing a data storage configuration request. A user may select the level of interaction and the user's data configuration request is received at the data storage system by the UI 102. The UI 102 in turn communicates with the appropriate level service provider to initiate the request. Furthermore, a request received at a first level can result in multiple requests to a lower level to perform an operation. For example, a user may connect to the data storage system 12 at level 1 104a. In response, the level 1 service provider 104a may issue more than one request to provider 104b. In turn, each request to provider 104b may result in one or more requests to provider 104c which, in turn, communicates with adapters and other code modules to perform the requested operation.

The data storage configuration request may identify the user (e.g., by user identifier or other authentication information), the application for which the request is being made, and any user selections or input parameters.

In one embodiment, the service providers 104a-104c may be code modules which are included in the same appliance. Each of the service providers 104a-104c may provide a published interface or API (application programming interface). A first service provider at level n may issue a request of another lower level service provider by issuing an API call to the lower level service provider. The API may also be used to facilitate communications between the UI 102 and the different level service providers of 110. As described in more detail in following paragraphs, an API call from a first service provider to a second service provide may use rules or mappings to map the data received by the first service provider to the appropriate API call with parameters and any defaults in accordance with the received data. Thus, the rules or mappings may be used to map between levels of abstractions of the different service providers.

Although an embodiment may have all service providers 110 located in the same appliance or other component, the service providers may be characterized as remotable. One or more of the service providers may be located on different components having connectivity so that the API calls between service providers may be remote API calls as well as local API calls (e.g., service providers on same component). As an example, an embodiment may have multiple data storage systems included in a network. Each of the service provider may be located on a different data storage system.

Figure 4:
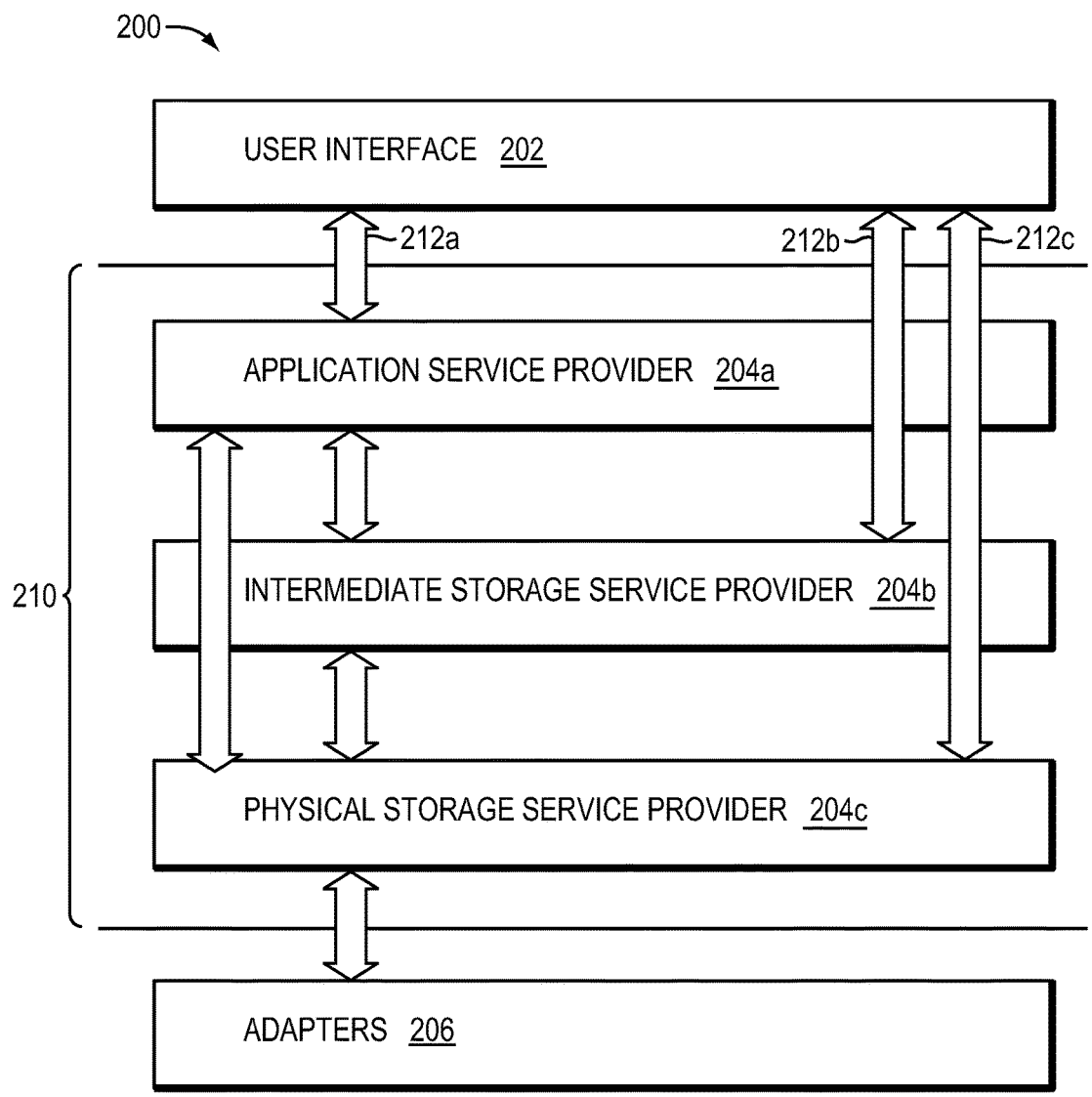

Referring to FIG. 4, shown is another example representation of components that may be included on the data storage system 12 for use in performing the techniques herein for determining suitability of storage. The example 200 is a more detailed illustration setting forth a particular instance of the different service providers and levels that may be included in an embodiment. Elements 202 and 206 are similar, respectively, to elements 102 and 106. Element 210 includes 3 service providers: application service provider 204a, intermediate or generic storage service provider 204*b* and physical storage service provider 204*c*. With respect to a level hierarchy, 204*a* may correspond to level 1 service provider 104*a* of FIG. 2, 204*b* may correspond to level 2 service provider 104*b* of FIG. 3, and 204*c* may correspond to level 3 service provider 104*c* of FIG. 3.

The application service provider 204*a* may have an application-specific focus and provide a level of abstraction customized for an application such as, for example, a particular email application, law office application or medical office application, as well as a class of related applications, such as a multiple email applications. When interacting with provider 204*a* for a particular application, the interface language may vary with the application. For example, if the application is a law office application, the interface language, menu options, and the like, may be tailored to the law profession. Similarly, a medical office application may utilize an interface language, menu options, and the like, familiar to the medical office. As such, the application service provider 204*a* may use one set of rules or mappings for each application to implement the application specific best practices for the user level. A first set of rules for the medical office application may be used to map the user input parameters using medical office terminology to parameters for the appropriate API calls for other service providers 204*b* and/or 204*c*. A second set of rules for the law office application may be used to map the user input parameters using law office terminology to parameters for the appropriate API calls for other service providers 204*b* and/or 204*c*. The user connecting to the data storage system at the application service provider level 204*a* may be provided with a user interface customized for the selected level and application to display a suitability ranking of a storage pool.

The intermediate storage service provider 204*b* may be an intermediate or second level of user interaction. As illustrated, the provider 204*a* may communicate with 204*b* when implementing a request for data storage provisioning. In one embodiment, a user connecting to provider 204*b* may be provided with a generic level of interaction which may not be tailored for the particular application. In other words, the same language and user interface may be presented to a user for multiple applications such as the medical application or law office application. As a variation to the foregoing, the service provider 204*b* may be customized for each application and provide for a more detailed level of exposure that varies per application.

The physical storage service provider 204*c* provides the most detailed or greatest level of exposure of the underlying data storage system. The provider 204*c* may be customized for the particular storage vendor and associated options. The user interface for a user connected at level 3 to service provider 204*c* may include menu options and terms particular to the underlying storage vendor and the more knowledgeable user. For example, the user may specify particular devices, RAID levels and techniques, file types, SCSI and iSCSI terminology, and the like.

The best practices and the automation of the best practices as described in more detail in following paragraphs may be customized for a particular application and the particular data storage system and environment. In other words, the best practices may vary in accordance with the particular application as well as the underlying data storage system and environment. For example, different practices may be preferred for a same application as the underlying data storage system changes. In such an instance, for example, there may be a first set of mappings used for mapping level 204*a* information to level 204*b* providing automation of best practices for a user connecting at level 204*a* for the application. The same first set of mappings may be used even if the data storage system differs. Other mapping rules may be used to map level 204*b* information to level 204*c* information in accordance with the best practices for the underlying data storage system. As the data storage system changes, the mappings used for level 204*b*-level 204*c* mapping may change although the same first set of mappings may be used.

Providing different levels of application-specific user interaction as described above, where each level may vary with the knowledge required to perform a data storage configuration operation such as a provisioning request for a particular application, is further described, for example, in U.S. Pat. No. 7,523,231, Apr. 21, 2009, Gupta et al. APPLICATION AWARE STORAGE (the '231 patent), which is incorporated by reference herein. The '231 patent describes use of different application-specific user interactions with file systems and/or block storage in order to provide varying levels of automation in accordance with different levels of user knowledge for provisioning. As such, the '231 patent describes an embodiment in which a user may be exposed to varying levels of detail regarding file systems and block storage device configuration, where the level of detail exposed varies with a selected level of user interaction and expected knowledge or skill. The foregoing techniques may be further applied for use with provisioning storage for particular applications where data used by the applications may be stored as objects in an object-based storage system. In other words, a user may be exposed to varying levels of detail regarding options used with the object-based aspects or layer(s) of data storage in a manner similar to varying user exposure at varying levels to aspects of file system and/or underlying device configuration for block storage. This is described in more detail in following paragraphs and figures.

In an object-based storage environment, data may be stored as an object within a pool of objects. The object may be retrieved using an object identifier. An application referencing an object or performing an operation on an object (e.g., read, write, delete) may not specify a directory or device location for the object. Rather, the object may be referenced by the application using the object identifier, for example, to retrieve the previously stored content of the object. In one embodiment, the objects may be characterized as a flat, non-hierarchical pool where the object identifier allows retrieval of the object from the pool. As will be described in more detail, the object-based system may be implemented on top of one or more underlying technology layers such as a file system, block storage, and/or database. As such, the complexity of performing a data storage provisioning operation may further increase with object-based storage which may be implemented using one or more other technology layers (e.g., file system, block storage and/or a database).

An example of an object-based storage system is a content-addressable storage (CAS) system. In a CAS system, data or content of the object is stored using a content address generated based upon the contents of the data of the object itself. The content address may be generated by applying a hash function to the data to be stored. The content address may be mapped within the data storage system to one or more physical storage locations within the data storage system. More generally, CAS systems use techniques where stored objects may be identified based on the content. However, the techniques described herein may be used in other embodiments where an object identifier is determined in other ways rather than being based on the contents of the stored object itself. As such, although CAS is used to illustrate the techniques herein, it should be noted that CAS is only one exemplary implementation of an object-based storage system that may be used with techniques herein and the techniques herein should not be construed as being limited for use with a CAS object-based embodiment.

CAS systems are further described, for example, in U.S. Pat. No. 6,807,632, Oct. 19, 2004, CONTENT ADDRESSABLE INFORMATION ENCAPSULATION, REPRESENTATION, AND TRANSFER, Carpentier et al.; U.S. Pat. No. 6,976,165, Dec. 13, 2005, SYSTEM AND METHOD FOR SECURE STORAGE, TRANSFER AND RETRIEVAL OF CONTENT ADDRESSABLE INFORMATION, Carpentier et al.; U.S. Pat. No. 7,398,391, Jul. 8, 2008, CONTENT ADDRESSABLE INFORMATION ENCAPSULATION, REPRESENTATION, AND TRANSFER, Carpentier et al.; and U.S. Pat. No. 7,415,731, Aug. 19, 2009, CONTENT ADDRESSABLE INFORMATION ENCAPSULATION, REPRESENTATION, AND TRANSFER, Carpentier et al., all of which are incorporated by reference herein. Additionally, CAS is an example of object-based storage system that may be implemented on top of (i.e., using) one or more underlying technologies. For example, U.S. Pat. No. 7,376,681, May 20, 2008 to Todd et al., METHODS AND APPARATUS FOR ACCESSING INFORMATION IN A HIERARCHICAL FILE SYSTEM, which is incorporated by reference herein, describes use of a software CAS layer implemented on top of file system(s) and block storage so that the contents are ultimately stored on a block I/O storage system.

Figure 5:
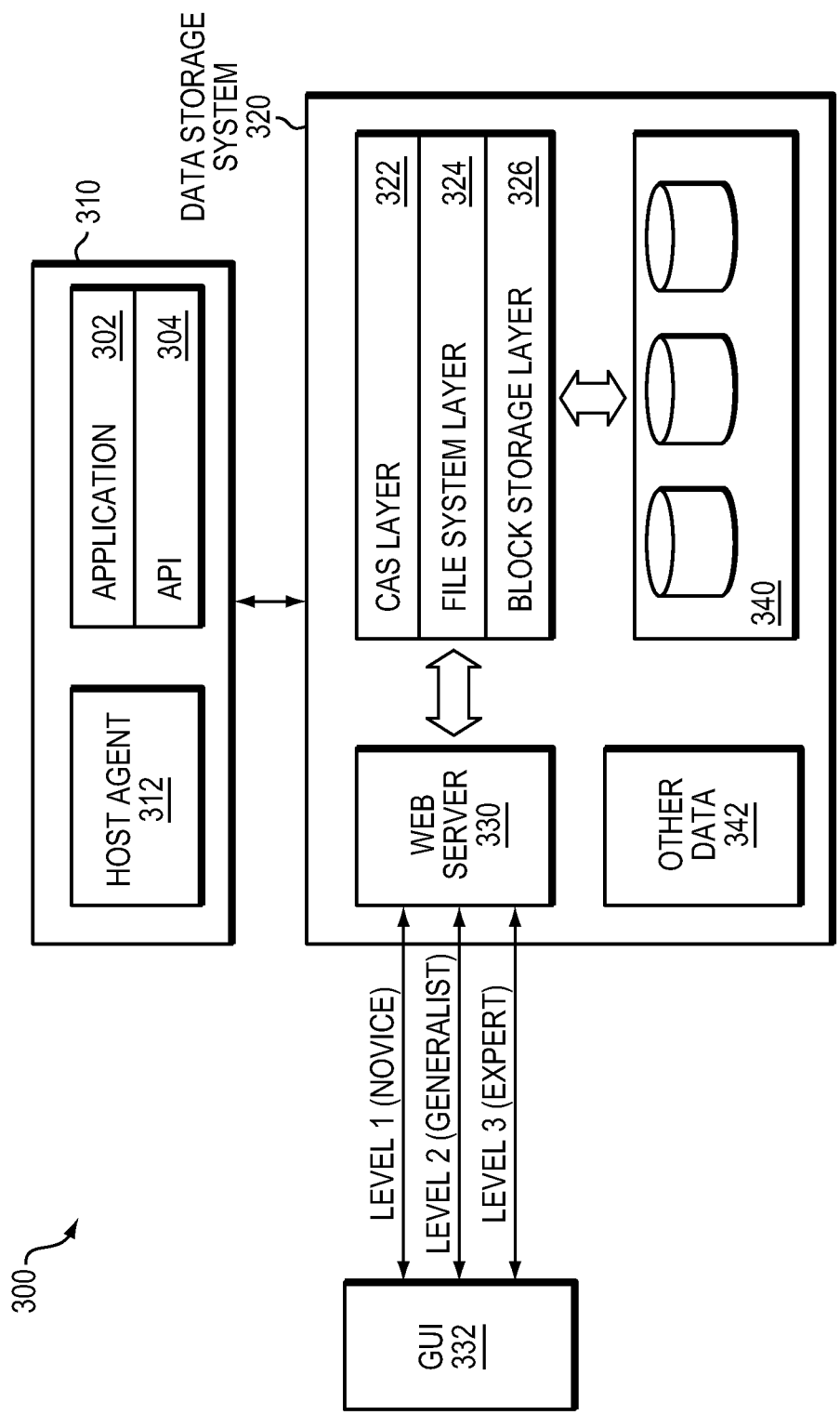

Referring to FIG. 5, shown is an example of an embodiment of a host communicating with a data storage system in accordance with techniques herein. The example 300 includes a host 310 and a data storage system 320. The host 310 may include one or more applications 302, an API (application programming interface) 304, and host agent 312. The data storage system 320 may include a web server 330, storage devices 340, and software executing thereon comprising CAS layer 322, file system layer 324 and block storage layer 326. GUI (graphical user interface) 332 may correspond to one type of UI represented by element 102 of FIG. 3 and element 202 of FIG. 4. The GUI 332 may provide functionality as described herein so that a user may interact with the data storage system 320 at any one of a plurality of levels when performing data storage management operations, such as storage provisioning requests. In the example 300, 3 levels (Novice, Generalist and Expert) are illustrated. In accordance with different levels of expertise or knowledge, each of the 3 user interaction levels may provide the user with different levels of automation and varying levels of exposure to details in connection with performing an operation such as for a storage provisioning request.

The GUI 332 may communicate with the web server 330 of the data storage system in connection with a request such as to provision storage for a particular application (e.g., application 302 of host 310). In turn, the web server 330 may communicate (directly and/or indirectly) with one or more other layers of software 322, 324 and 326 executing on the data storage system and with a host agent 312 in connection with performing the request, such as to provision storage for application 302. The web server 330 and/or other software executing on the data storage system 320 may also access other data 342 (e.g., application customization options, rules, and the like) in connection with performing processing of techniques described herein.

Application 302 executing on the host 310 may be, for example, an email application, a medical office application, a law office application, and the like. The application 302 may communicate with the data storage system 320 when issuing requests, such as to perform operations (e.g., read, write, modify) on application data stored as objects on the data storage system 320. The application 302 may communicate with the data storage system 320 using API 304. The API 304 may be, for example, code of a software development kit (SDK) for use when interfacing with CAS layer 322 to perform operations on the application data stored on devices 340. The host agent 312 may be software executing on the host 310 used in connection with techniques herein as will be described in following paragraphs. The host agent 312 may, for example, communicate with the GUI 332 in connection with configuring the host with authentication information used, for example, when the application 302 issues a request using API 304 to store data on the data storage system in accordance with an object-based storage system such as system 320 using CAS 322.

In connection with using CAS or another object-based storage system or layer, it should be noted that an embodiment may implement the CAS layer using one or more other software technologies than as illustrated in the example 300. The example 300 illustrates CAS 322 being implemented using file systems and block storage. However, CAS 322 may be implemented using other layers and associated technologies. For example, CAS 322 may be implemented on top of, or using, a database rather than a file system 324. The database may then use functionality represented by the block storage layer 326.

In one embodiment as will be described in more detail in following paragraphs, each of the 3 levels—denoted in FIG. 5 as Novice, Generalist and Expert—may provide a different level of automation and varying level of exposure to details, options and the like, associated with performing a requested application-specific operation, such as to provision storage for the application 302 on host 310. In accordance with techniques herein, as described in the '231 patent, each of the 3 levels may provide varying levels of automation and exposure to details of the file system and block storage layers when implementing a request to provision storage. Additionally, as described in more detail below, each of the 3 levels may provide a corresponding level of automation and exposure to details of the CAS layer 322 when implementing a request to provision storage.

Figure 6:
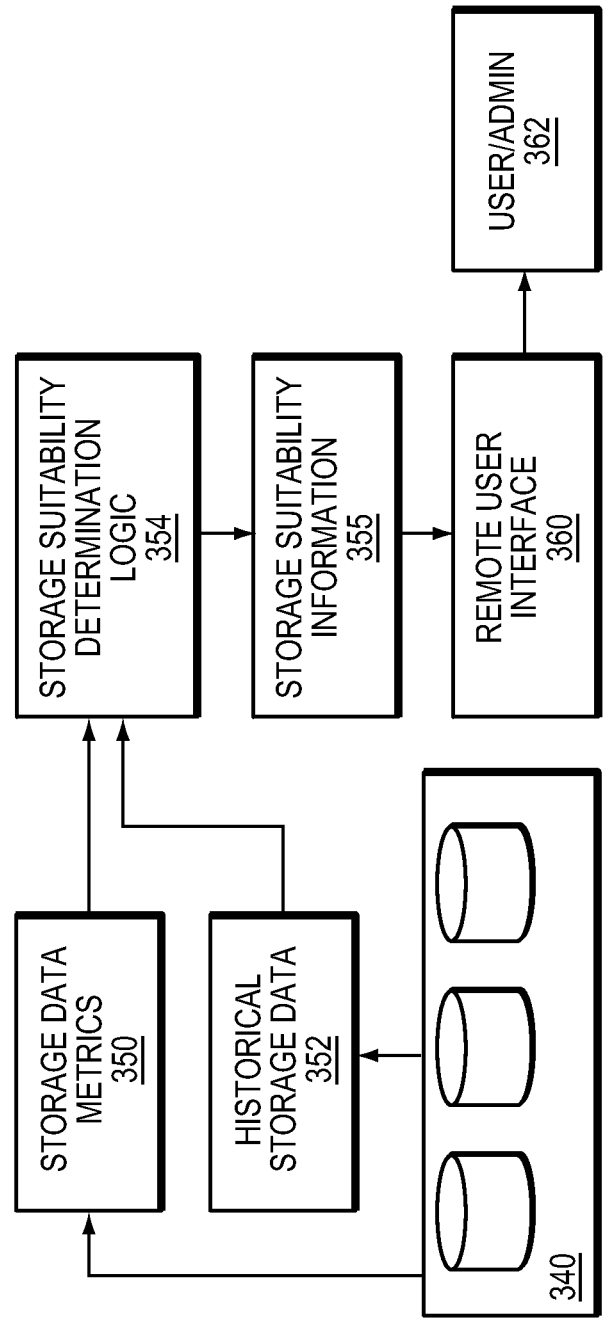

Referring to FIG. 6, shown is detailed representation of components that may be included in an embodiment using the techniques herein. In at least one embodiment of the current technique, storage suitability determination logic 354 analyzes information such as storage data metrics 350, and historical storage data 354 for determining storage suitability information 355 for each storage pool of a storage space 340 available to data storage system 12. Storage suitability information 355 for storage pools is provided to user 362 (e.g. storage administrator) of data storage system 12 via remote user interface 360 that may include GUI 332 of FIG. 5 and a command line interface.

In at least one embodiment of the current technique, storage suitability for a storage is determined based on more than one storage characteristics such as a rating for the storage, a subscription rate for the storage and a depth for the storage, described in detail herein further below. The depth for a storage provides to a user up-to-date suitability of the storage that may change based on consumption of the storage by applications.

In at least one embodiment of the current technique, storage data metrics 350 includes data such as an amount of storage space consumed by each application executing on data storage system, a size of a storage pool used by an application, a number of applications consuming a storage space of a storage pool, and a type of each application consuming a storage space of a storage pool. Historical storage data 352 includes data such as a rate at which data of an application grows, a rate at which storage space of a storage pool is consumed by an application, and a rate at which a number of applications consuming a storage space of a storage pool changes. Storage suitability determination logic 354 may use one or more methods for determining suitability of a storage such as a storage pool. In at least one embodiment of the current technique, storage suitability determination logic 354 may determine a set of storage suitability characteristics for a storage pool indicating how suitable a storage pool may be for provisioning a storage space for an application based on requirements of the application. Storage suitability determination logic 354 determines suitability of a storage pool based on the set of storage suitability characteristics. In at least one embodiment of the current technique, a storage suitability characteristic may include a star rating value for a storage pool, a subscription for a storage pool, a depth of storage space available for an application using a storage pool. A star rating value associates a number of stars with a storage pool indicating suitability of the storage pool. For example, in at least one embodiment, a star rating value of one star may indicate that a storage pool is a good fit for an application, a star rating value of two stars may indicate that a storage pool is a better fit for an application, and a star rating value of three stars may indicate that a storage pool is a best fit for an application. Further, in at least one embodiment of the current technique, a star rating value for a storage pool changes dynamically as the available storage space of the storage pool changes.

In at least one embodiment of the current technique, a subscription for a storage pool is a percentage of storage in a storage pool that may be allocated to applications and host systems. A subscription for a storage pool is calculated from information such as a total amount of potential future storage allocation of the storage pool by applications, and a total amount of storage space (also referred to as size of a storage pool) allocated to the storage pool. For example, in a thin provisioned data storage system, a storage pool of size 200 gigabytes (GB) includes a first application using thin provisioning that allocates 30 gigabyte (GB) of storage space from the storage pool with a potential future storage allocation of 50 gigabytes (GB), and a second application that allocates 25 gigabyte (GB) of storage space from the storage pool. In such an example, the subscription value for the storage pool is 38% (computed as ((50 GB+25 GB)/200 GB)*100). In such an example, the subscription value of 38% indicates that if the first and second applications consuming a storage space from the storage pool expands to their respective potential future storage allocation, 62% of the storage pool may be available for provisioning storage. However, a storage pool may be over subscribed (also referred to as "oversubscription" or "over-commitment"). Oversubscription of a storage pool occurs when the subscription value of the storage pool exceeds 100%. Generally, in a data storage system, an application or a user requesting a storage space does not consume all the storage space allocated by a data storage system. Thus, a storage administrator may achieve a higher rate of storage utilization by oversubscribing the data storage system in such a way that when an application is created, the application is allocated a small percentage of a storage pool that is actually consumed by the application, and an additional storage space is only allocated to the application when the application expands and requires a storage space for storing data. Thus, in at least one embodiment of the current technique, suitability of a storage pool is determined by combining storage suitability characteristics such as a star rating value of a storage pool, a subscription rate of a storage pool and a depth of a storage pool. A storage administrator may efficiently determine suitability of a storage pool when suitability of the storage pool is determined by combining more than one storage characteristic.

In at least one embodiment of the current technique, a depth of a storage pool depends upon storage characteristics of a set of applications consuming a storage space of the storage pool, and characteristics of the storage pool. A storage characteristic of an application includes a potential future size of the application, and a rate at which data of the application grows. A characteristic of a storage pool includes a number of applications using the storage pool, types of applications using the storage pool, and a rate at which data of an application using the storage pool expands. In at least one embodiment of the current technique, the depth of a storage pool may be presented to a user 362 as a "bench strength". In at least another embodiment of the current technique, the depth of a storage pool may be presented to a user as a "level of risk" indicating a risk of using the storage pool for provisioning storage for an application.

Conventionally, a user is presented with information such as a total amount of storage allocated by an application and an amount of storage actually used by the application. However, in a thin provisioned data storage system, an application is allocated a less amount of storage than the application requests. A thin provisioned data storage system in such a case monitors a current size (an amount of storage space actually used by an application) and a future size (the maximum amount of storage space an application may consume) of an application. In at least one embodiment of the current technique, a depth of a storage pool is determined by analyzing information such as current sizes of applications consuming storage from the storage pool, potential future sizes of the applications, storage information indicating trends for predicting when an application may reach its potential future size, and storage information indicating how storage allocations by applications sharing the storage pool may effect each other. Thus, in at least one embodiment of the current technique, a depth of a storage pool is a storage characteristic that provides to a user of the storage pool information regarding whether the storage pool is adequate to satisfy current and future storage requirements of an application. Hence, in at least one embodiment of the current technique, a user may need to only evaluate a depth of a storage pool for determining whether an application consuming the storage pool may run out of storage space. Thus, in at least one embodiment of the current technique, a user may not need to manually gather and analyze a large amount of storage information. In at least one embodiment of the current technique, storage suitability determination logic 354 determines a current suitability of a storage pool, and predicts a future suitability for the storage pool based on storage data metrics 350 and historical storage data 352.

In at least one embodiment of the current technique, a depth of a storage pool may be presented to user 362 as a bench strength of the storage pool. A bench strength of a storage pool indicates an ability of the storage pool for satisfying storage requirements of applications consuming the storage pool. For example, if an administrator may like to add five hundred new users to a thin application, a bench strength of the storage pool indicates whether the storage pool has an adequate amount of storage space available for allocating storage that may be requested by five hundred new users. In a data storage system where a depth of a storage pool is indicated by a bench strength, more depth indicates that the storage pool has an adequate amount of storage space available for allocating storage that may be provisioned by applications using the storage pool, and an application consuming the storage pool is less likely to encounter an out of storage space error. An out of storage space error indicates that the storage pool does not have any storage available for allocation.

In at least one embodiment of the current technique, a depth of a storage pool may be presented to user 362 as a risk level indicating a risk that the storage pool may encounter the out of storage space error. In a data storage system where a depth of a storage pool is indicated by a risk level, less depth signifies a lower level of risk indicating that the storage pool is less likely to encounter the out of storage space error. In at least one embodiment of the current technique, a risk level for a storage pool may include one or more levels such as high, medium and low. Further, in at least another embodiment of the current technique, a risk level may include a value on a continuous scale.

It should be noted that a bench strength or a risk level of a storage pool are one of the many ways a depth of a storage pool may be provided to user 362 of a data storage system. It should be noted that any of the other schemes such as a color scheme or thermometer reading may be used to present a depth of a storage pool to a user 362 of a data storage system.

Storage suitability information 355 such as a depth of a storage pool may be presented to a user 362 by displaying information 355 using a remote user interface 360. A user 362 may include an application administrator who creates new application on a data storage system or migrates an application from a data storage system to another data storage system. Further, user 362 may include a storage administrator who adds additional storage space to a data storage system such that applications executing on the data storage system do not fail due to the out of storage space error. Further, storage suitability information 355 may be presented to user 362 at different times such as when the user creates an application on a data storage system, monitors applications executing on the data storage system, migrates applications from the data storage system to another data storage system, or creates a storage pool on the data storage system. In at least one embodiment of the current technique, user 362 is notified by an alert when suitability of a storage pool changes. When storage characteristics of applications executing on a storage pool changes, storage suitability determination logic 354 re-computes storage suitability characteristics for the storage pool and notifies user 362 of a change in the suitability of the storage pool. Further, a depth of a storage pool may be presented using a scheme of colors, and graphical shapes in a graphical user interface (GUI).

In at least one embodiment of the current technique, for example, if a data storage system includes a thick application, any storage pool that has a storage space available that is equal to or more than that is requested by the thick application is suitable for provisioning storage for the thick application because the storage space requested by the thick application is generally pre-allocated. In such an example, a user of the thick application may not need to monitor a rate at which the application grows because the application in such a case has all the storage space it needs. Thus, in such an example, the bench strength of the storage pool consumed by the application is infinite and the level of risk that the application may encounter the out of space error is zero or non existent. Thus, in such an example, suitability of a storage pool does not change over time.

In at least one embodiment of the current technique, for example, if a data storage system includes a thin application that is expected to grow at a slow rate, a large number of storage pools may be suitable for provisioning storage for such a thin application as the rate at which the thin application may consume storage is low indicating that the suitability of a storage pool selected for provisioning storage may not change drastically over time. In such an example, user 362 of the thin application may need to constantly monitor storage suitability information 355 for the storage pool. Thus, in such an example, the bench strength of the storage pool that is consumed by the application is high indicating that the storage pool has an adequate amount of storage available for provisioning storage to the thin application when the thin application expands and requires additional storage space. Additionally, in such an example, the level of risk is low indicating that the risk of the application encountering the out of space error is low. Thus, in this example, suitability of the storage pool changes over time in such a way that the bench strength decreases and the level of risk increases. However, in such an example, if user 362 adds an additional storage space to the storage pool or migrates one or more applications from the storage pool to another data storage system, thereby increasing the amount of available storage space, the bench strength of the storage pool increases and the level of risk of the storage pool decreases.

In at least one embodiment of the current technique, for example, if a data storage system includes a thin application that is expected to grow at a high rate, only a storage pool that has a high suitability value may be suitable for provisioning storage for such a thin application as the rate at which the thin application may consume storage is high indicating that the suitability of the storage pool selected for provisioning storage may change drastically over time. In such an example, user 362 of the thin application may need to constantly monitor storage suitability information 355 for the storage pool. Thus, in such an example, the bench strength of the storage pool that is consumed by the application is medium or low value indicating that the storage pool may not have an adequate amount of storage space available for provisioning storage to the thin application when the thin application expands at a rapid pace and may require an additional storage space. Further, in such an example, the level of risk is high indicating that the risk of the application encountering the out of space error is high. Thus, in this example, suitability of the storage pool changes over time in such a way that the bench strength of the storage pool decreases and the level of risk for the storage pool increases. However, in such an example, if user 362 adds an additional storage space to the storage pool or migrates one or more applications from the storage pool to another data storage system, thereby increasing the amount of available storage space, the bench strength of the storage pool increases and the level of risk for the storage pool decreases.

Figure 7:
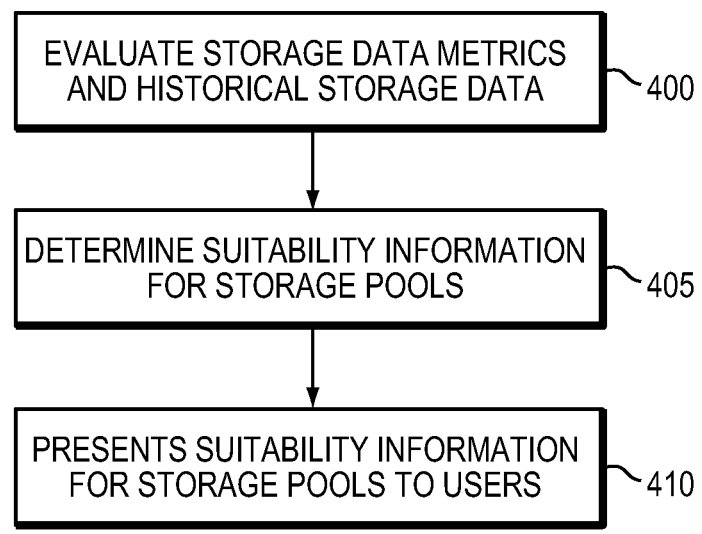
FIG. 7 is a flow diagram illustrating processes that may be used in connection with techniques herein.

Referring to FIG. 7, shown is a flow diagram illustrating the method of determining suitability of storage in data storage systems. With reference also to FIGS. 1 and 6, storage data metrics 350 and historical storage data 352 is evaluated by data storage system 12 (step 400). Based on the evaluation, suitability information 355 (e.g. suitability characteristic) for a storage pool is determined (step 405).

Suitability information 355 is then presented to a user 362 (e.g., storage administrator) of the data storage system 12 (step 410).

Figure 8:
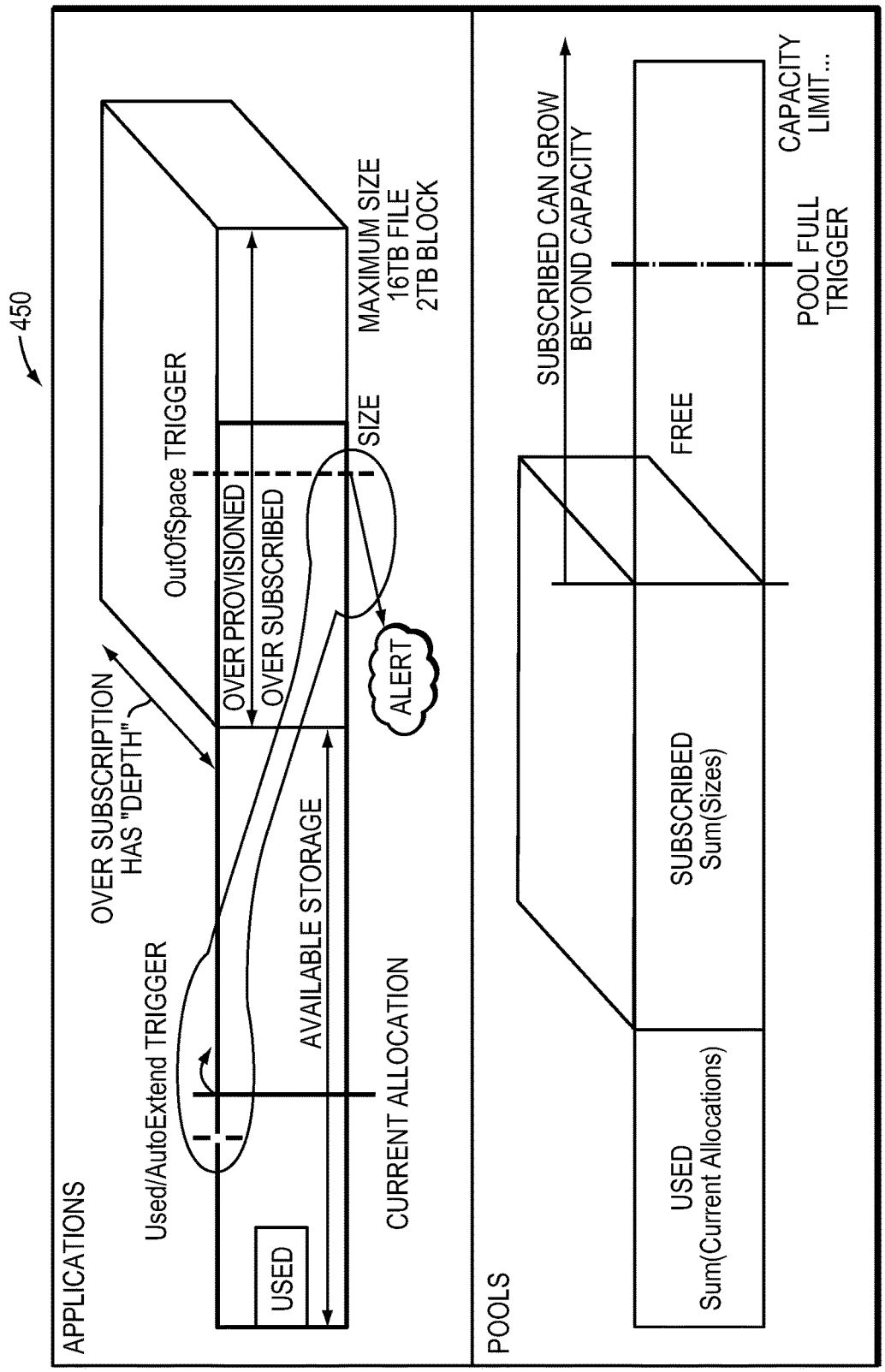
FIG. 8 is a block diagram illustrating in more detail components that may be used in connection with techniques herein.

Referring to FIG. 8, shown is an illustration of one of the many ways a suitability of a storage pool may be indicated to a user in data storage systems. Shown in FIG. 8 is an example of snapshot 450 of a user interface of a data storage system 12. With reference also to FIG. 6, storage suitability information 355 for a storage pool is provided to a user. The storage suitability information includes an amount of storage space used or allocated by an application, an amount of storage space subscribed to an application, and an amount of storage space available in the storage pool for provisioning additional storage space. Additionally, storage information for an application is provided to the user. The storage information for an application includes an amount of storage space consumed by the application, an amount of storage space available for the application, an amount of storage space that is oversubscribed to the application, a future size of the application, a depth of the application, and an alert indicating the out of space error for the application.

Figure 9:
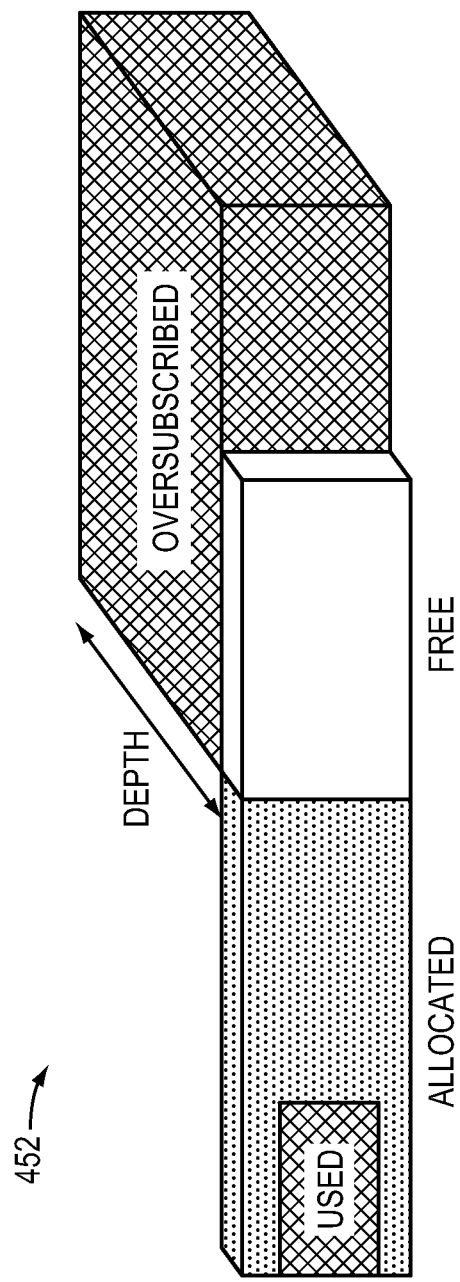
FIGS. 9-12 are representations of a graphical user interface and are an example of an embodiment of a computer system that may utilize the techniques described herein.

Referring to FIG. 9, shown is an illustration of one of the many ways a suitability of a storage pool may be indicated to a user in data storage systems. Shown in FIG. 9 is an example of snapshot 452 of a user interface of data storage system 12 indicating a level of risk for an application consuming a storage pool.

Figure 10:
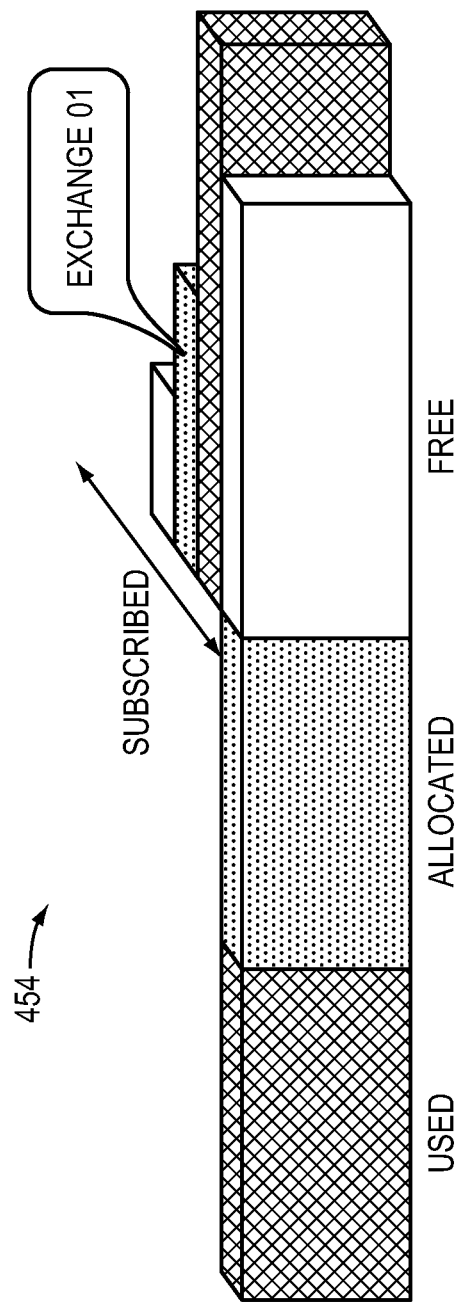

Referring to FIG. 10, shown is an illustration of one of the many ways a suitability of a storage pool may be indicated to a user in data storage systems. Shown in FIG. 10 is an example of snapshot 454 of a user interface of data storage system 12 indicating a level of risk for a set of applications consuming a storage pool. Each of the application of the set of applications are shown to have a different level of risk.

Figure 11:
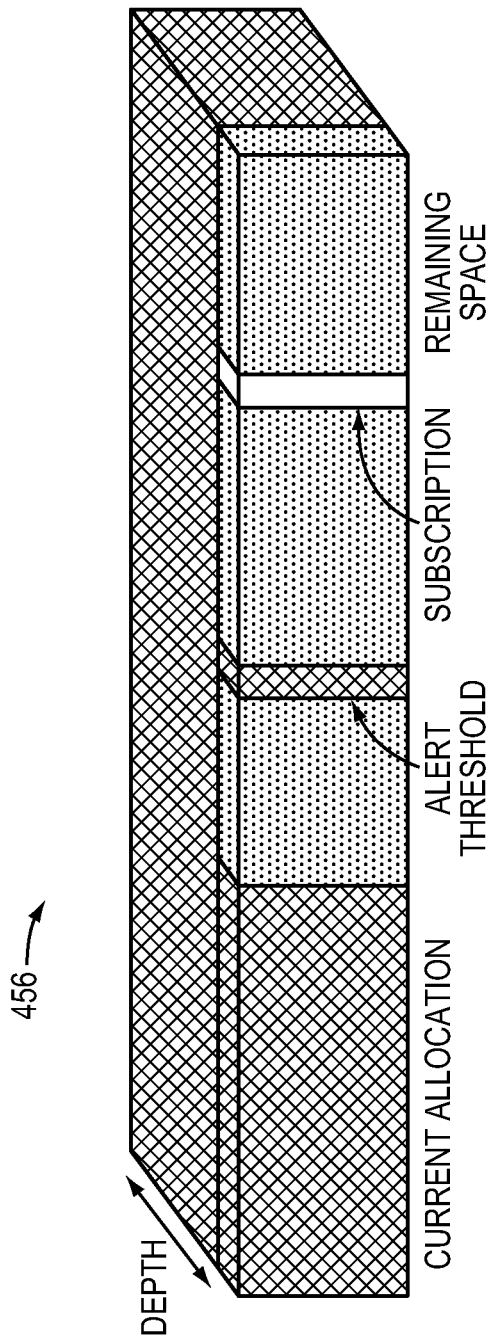

Referring to FIG. 11, shown is an illustration of one of the many ways a suitability of a storage pool may be indicated to a user in data storage systems. Shown in FIG. 11 is an example of snapshot 456 of a user interface of data storage system 12 indicating a bench strength for an application consuming a storage pool.

Figure 12:
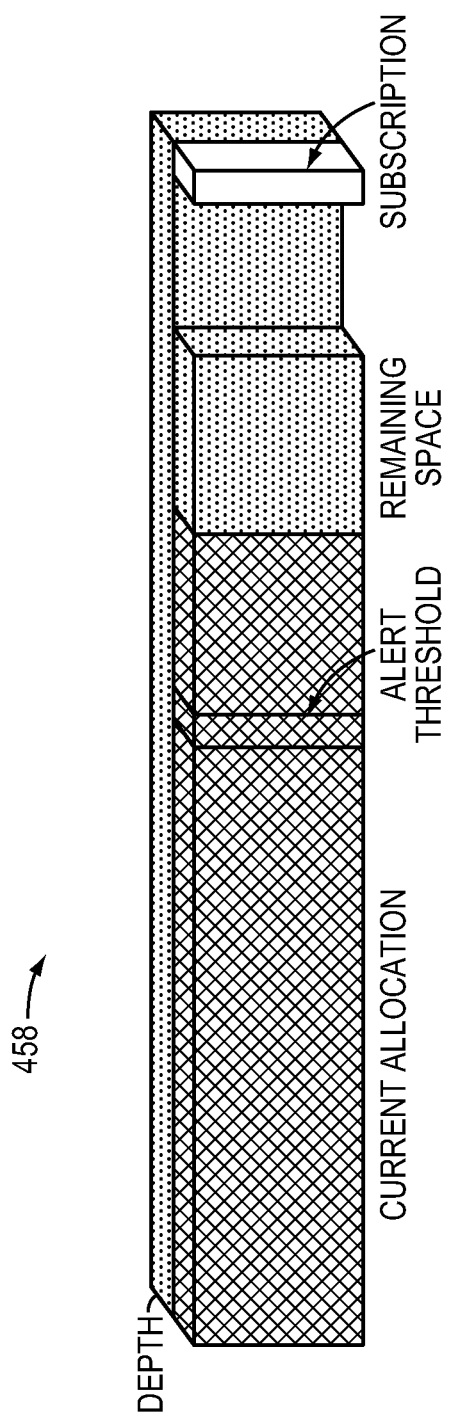

Referring to FIG. 12, shown is an illustration of one of the many ways a suitability of a storage pool may be indicated to a user in data storage systems. Shown in FIG. 12 is an example of snapshot 458 of a user interface of data storage system 12 indicating a bench strength for an application consuming a storage pool.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, executed by one or more processors, for determining suitability of storage, the method comprising:
dynamically analyzing storage data of a data storage system, wherein the storage data includes information associated with use of a storage pool of a set of storage pools of the data storage system by an application of the data storage system, wherein the information includes a storage type, capabilities of the storage pool, storage data metrics, historical storage data, and application best practices, wherein the storage data metrics includes an amount of storage space consumed by a first application executing on the data storage system, an amount of the storage pool used by the first application, a type of the first application and a number of applications consuming storage space of the storage pool, wherein the historical storage data includes a rate at which an amount of data of the first application changes, a rate at which storage space of the storage pool is consumed by the first application, and a rate at which the number of applications that have been consuming storage space of the storage pool changes;
dynamically determining a storage suitability characteristic for each storage pool of the set of storage pools for allocating storage space for the first application, wherein the storage suitability characteristic includes a storage suitability ranking for the respective storage pool;
providing the storage suitability characteristic for each storage pool of the set of storage pools to a user via a user interface for allocating the storage space for the first application in the data storage system and enabling the user, via the user interface, to select a storage pool that best suits the first application at the time of selection based on changing requirements of the first application as the storage suitability characteristic for each storage pool changes dynamically as available storage space of the storage pool changes;
selecting a storage pool from the set of storage pools that best suits the first application for allocating the storage space for the first application, wherein selecting the storage pool includes allocating the storage for the first application based on the storage suitability characteristics of the selected storage pool; and
dynamically updating the storage suitability characteristic for each storage pool of the set of storage pools based on changes in the selected storage pool, the storage data, a number of new applications, and storage usage of the first application, wherein the storage suitability characteristic for each storage pool indicates to the user how suitable each storage pool is for allocating storage space for an application based on storage requirements of the first application.

2. The method of claim 1, wherein each storage pool includes a set of logical volumes.

3. The method of claim 1, wherein the storage suitability characteristic for each storage pool includes a depth of each storage pool, a rating for each storage pool and a subscription rate of each storage pool, wherein the subscription rate indicates a percentage of storage space available in each storage pool for allocation.

4. The method of claim 3, wherein the depth of each storage pool indicates to the user suitability of each storage pool, wherein the depth is based on characteristics of an application consuming a storage space from each storage pool and characteristics of each storage pool.

5. The method of claim 3, wherein the depth of each storage pool includes a bench strength, wherein the bench strength indicates a storage capability of each storage pool for allocating storage space for an application.

6. The method of claim 3, wherein the depth of each storage pool includes a level of risk, wherein the level of risk indicates a risk of encountering an out of available storage space error by an application.

7. The method of claim 3, wherein the depth of each storage pool is displayed to a user by a graphical user interface.

8. The method of claim 1, further comprising: notifying the user by an alert based on a change in suitability of each storage pool.

9. The method of claim 1, further comprising:
recommending to the user a suitable storage pool for provisioning storage space for the first application.

10. A system for determining suitability of storage, the system comprising a data storage system including a memory including instructions and a processor configured to execute the instructions from memory to:
dynamically analyze storage data of the data storage system, wherein the storage data includes information associated with use of a storage pool of a set of storage pools of the data storage system by an application of the data storage system, wherein the information includes a storage type, capabilities of the storage pool, storage data metrics, historical storage data, and application best practices, wherein the storage data metrics includes an amount of storage space consumed by a first application executing on the data storage system, an amount of the storage pool used by the first application, a type of the first application and a number of applications consuming storage space of the storage pool, wherein the historical storage data includes a rate at which an amount of data of the first application changes, a rate at which storage space of the storage pool is consumed by the first application, and a rate at which the number of applications that have been consuming storage space of the storage pool changes;
dynamically determine a storage suitability characteristic for each storage pool of the set of storage pools for allocating storage space for the first application, wherein the storage suitability characteristic includes a storage suitability ranking for the respective storage pool;
provide the storage suitability characteristic for each storage pool of the set of storage pools to a user via a user interface for allocating the storage space for the first application in the data storage system and enable the user to select a storage pool that best suits the first application at the time of selection based on changing requirements of the first application as the storage suitability characteristic for each storage pool changes dynamically as available storage space of the storage pool changes;
select a storage pool from the set of storage pools that best suits the application for allocating the storage space for the first application, wherein selecting the storage pool includes allocating the storage for the first application based on the storage suitability characteristics of the selected storage pool; and
dynamically update the storage suitability characteristic for each storage pool of the set of storage pools based on changes in the selected storage pool, the storage data, a number of new applications, and storage usage of the first application, wherein the storage suitability characteristic for each storage pool indicates to the user how suitable each storage pool is for allocating storage space for an application based on storage requirements of the first application.

11. The system of claim 10, wherein each storage pool includes a set of logical volumes.

12. The system of claim 10, wherein the storage suitability characteristic for each storage pool includes a depth of each storage pool, a rating for each storage pool and a subscription rate of each storage pool, wherein the subscription rate indicates a percentage of storage space available in each storage pool for allocation.

13. The system of claim 12, wherein the depth of each storage pool indicates to the user suitability of each storage pool, wherein the depth is based on characteristics of an application consuming a storage space from each storage pool and characteristics of each storage pool.

14. The system of claim 12, wherein the depth of each storage pool includes a bench strength, wherein the bench strength indicates a storage capability of each storage pool for allocating storage space for an application.

15. The system of claim 12, wherein the depth of each storage pool includes a level of risk, wherein the level of risk indicates a risk of encountering an out of available storage space error by an application.

16. The system of claim 12, wherein the depth of each storage pool is displayed to a user by a graphical user interface.

17. The system of claim 10, further comprising: notify the user by an alert based on a change in suitability of each storage pool.

18. The system of claim 10, further comprising:
recommend to the user a suitable storage pool for provisioning storage space for the first application.

* * * * *